3,346,260
SPEED CHANGE MECHANISM
Martin C. Reed, Roselle, Ill., assignor to Warwick Electronics Inc., a corporation of Delaware
Filed Nov. 13, 1964, Ser. No. 410,941
10 Claims. (Cl. 274—9)

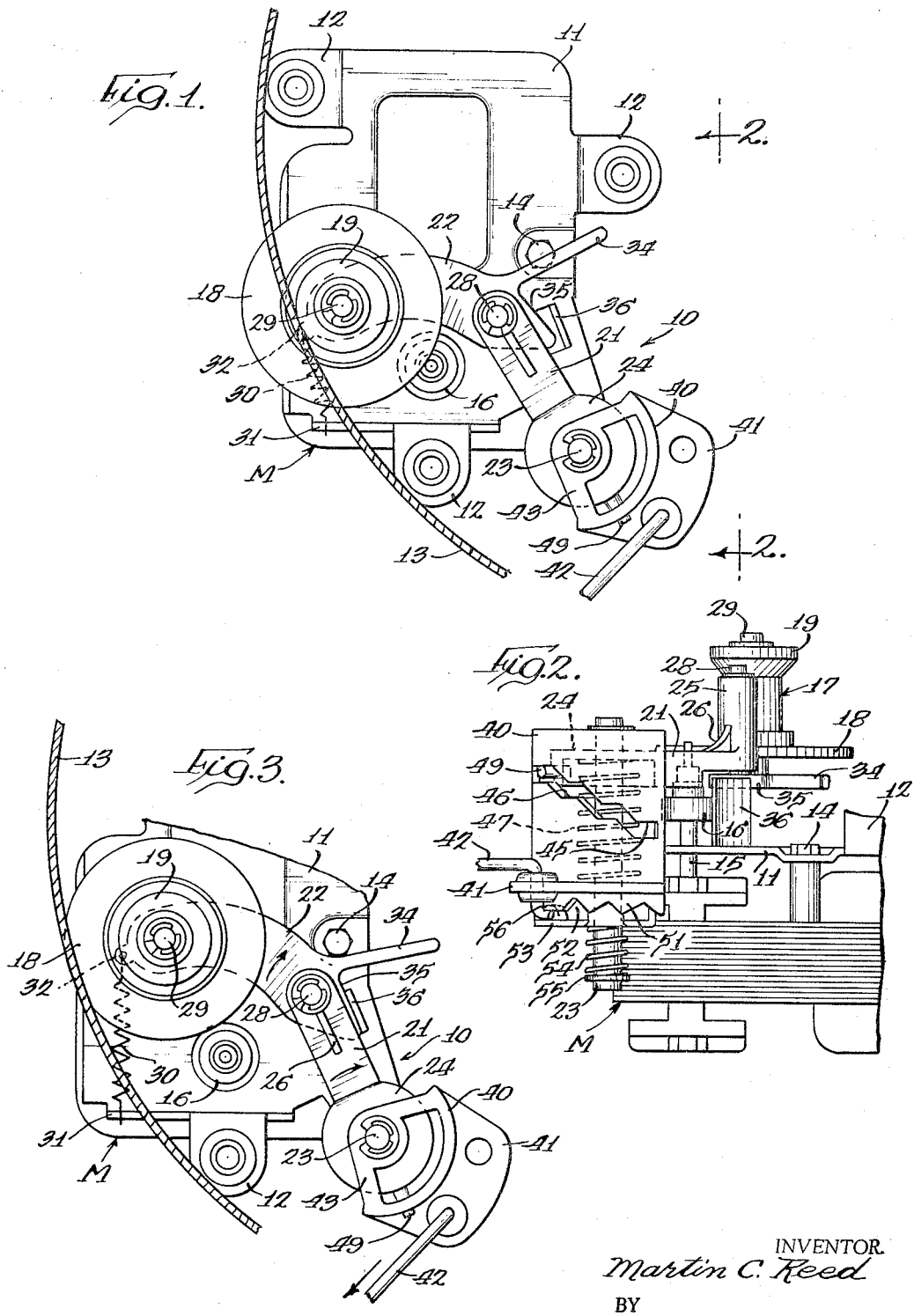

ABSTRACT OF THE DISCLOSURE

A speed change mechanism for use in a record changer in which the turntable rotating motor includes a shaft having step portions of different diameter, and wherein the driven means engageable with the stepped motor shaft and with the turntable is carried by a pivoted carrier link of an articulated linkage means. The carrier link is pivotally mounted upon an arm having cam follower means at one end thereof, which is engaged by a cam for moving the arm and carrier link to selectively position the driven means in alignment with the stepped portions of the motor shaft. A fixed abutment is provided on a support structure for the speed change mechanism, and is engageable with a portion of the carrier link to pivot the link to a position wherein the driven means is spaced outwardly of the largest diameter shaft step, so that the driven means can be moved from small diameter steps to large diameter shaft steps without difficulty.

This invention relates in general to a variable speed drive, and more particularly to means for rotating the turntable of a record changer at a plurality of different speeds.

In the record changer field it is well known to provide record changers with means for driving the record changer turntable at different speeds, as for example, 16 r.p.m., 33 r.p.m., 45 r.p.m., and 78 r.p.m. Various expedients have been resorted to by those skilled in the art for changing the turntable speed when desired, however, none of these expedients have proven to be entirely satisfactory. The speed change mechanism which has heretofore proven to be the most satisfactory has included a motor with a stepped sleeve on the output shaft thereof, and an idler wheel which is driven by the sleeve, and which drivingly engages a downwardly extending flange on the turntable for rotation of the same. In this expedient, cam means have been provided for shifting the idler wheel between the various steps on the motor shaft sleeve to effect the change of turntable speed. The present invention is an improvement of this type of speed change mechanism.

In the use of speed change mechanisms described above, little or no difficulty has been encountered when the idler wheel is shifted from large diameter steps on the motor output shaft sleeve to small diameter steps on the sleeve. However, when the idler wheel is being shifted from the small diameter sleeve steps to large diameter sleeve steps, there has been a tendency for the idler wheel to catch upon the larger diameter sleeve steps, and the shifting of the idler wheel has been impeded. Various expedients have been proposed to facilitate the shifting of the idler wheel from small diameter sleeve steps to large diameter sleeve steps, however, none of these have proven to be completely reliable under all conditions of service. An expedient which has been used in the past to effect the shifting of the idler wheel has been to utilize a cam contour to effect a shifting of the idler wheel out of engagement with the motor shaft sleeve prior to the vertical shifting of the idler wheel from one step of the sleeve to another by the cooperating cam and cam follower means. This expedient has had the drawback of requiring the cam to be precisely aligned relative to the idler wheel and the motor output shaft, so that the movement imparted to the cam would in fact shift the idler wheel an adequate amount so as to clear the sleeve on the motor shaft. Additionally, the requisite contours on the cam have made the same rather difficult to move, and have necessitated the use of a larger manual force to operate the same, which has often resulted in breakage of the unit. Accordingly, the general purpose of the present invention is to provide a new and improved speed change mechanism of the character described which is reliable in operation, yet relatively inexpensive to manufacture and maintain.

An object of the invention is to provide a speed change mechanism for use in a record changer for shifting the idler wheel of the turntable drive means positively to a clearance position spaced outwardly of the outer periphery of the drive sleeve on the motor output shaft.

Another object of the invention is to provide a speed change mechanism as described in the preceding paragraph with an articulated linkage carrying the idler wheel so that the idler wheel may be positively moved into a clearance position by the engagement of an abutment with a portion of the linkage.

A further object of the invention is to provide cam and cam follower means for operating a speed change mechanism as described above which are capable of being operated with a minimum amount of force.

These and other objects of the invention will hereinafter become more fully apparent from the following description taken in connection with the annexed drawing, wherein:

FIG. 1 is a plan view of a preferred embodiment of the speed change mechanism, with the idler wheel shown in driving engagement with the smallest step on the motor output shaft sleeve, and with the drive wheel engaging the flange of a record changer turntable, only a portion of which is shown;

FIG. 2 is a side elevational view of the speed change mechanism illustrated in FIG. 1, with the turntable removed; and FIG. 3 is a fragmentary plan view similar to FIG. 1, and showing the speed change mechanism during the shifting of the idler wheel from a small diameter step on the motor output shaft sleeve to a large diameter step on the sleeve.

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawing, wherein like reference characters designate like or corresponding parts throughout the several views, the illustrated embodiment of the speed change mechanism 10 is shown mounted on a bracket 11. Bracket 11 includes a series of upwardly extending feet 12, three of which are shown in the illustrated embodiment, that are adapted to be secured to the undersurface of a record changer motor board, not shown. A suitable record changer in which the subject speed change mechanism may be used is disclosed in detail in the copending application, Serial No. 402,462 of Reed et al. filed Oct. 8, 1964. As is conventional, and as is shown in the abovementioned Reed et al. application, the record changer turntable includes a downwardly extending flange 13 which is engaged by drive means to be hereafter described for rotating the turntable.

The drive means for rotating the turntable includes a drive motor assembly M secured to the bracket 11 by suitable fasteners 14. The output shaft 15 (FIG. 2) of the drive motor is provided with a stepped sleeve 16 at the upper end thereof. The smallest diameter step at the upper end of the sleeve 16 corresponds to the 16 r.p.m. speed of the turntable, while the next largest sleeve step immediately below the smallest diameter sleeve step corresponds to the 78 r.p.m. speed of the turntable, while the second largest sleeve step immediately above the largest sleeve step corresponds to the 45 r.p.m. speed of the turntable. It should be understood, of course, that while a stepped sleeve 16 has been disclosed herein as a part of the drive means, the present invention also contemplates that the output shaft of the motor may be stepped to obviate the necessity of a separate sleeve.

The drive means further comprises an idler wheel 17 including a large diameter lower portion 18 which is movable into and out of engagement with the sleeve 16 and an upper portion 19 of reduced diameter which is adapted to drivingly engage the turntable flange 13, as can be best seen in FIG. 1. Idler wheel portions 18 and 19 will be referred to hereinafter as a driven wheel and a driving wheel, respectively. The driven wheel 18 and driving wheel 19 are each formed of a somewhat resilient, high friction material so as to provide effective driving engagement with the sleeve 16 and turntable flange 13 respectively.

The idler wheel 17 is mounted on an articulated linkage means including a link 21 pivotally mounted on the bracket 11, and an arm 22 pivotally secured to the outer end of link 21. A vertically extending pin 23 is fixed to bracket 11, and the enlarged generally circularly shaped rear portion 24 of the link 21 is rotatably mounted on the pin 23. As will hereinafter appear, link 21 is also free to move vertically up and down relative to the pin 23. A vertical extending hollow sleeve 25 is provided at the forward or outer end of the link 21, and a strengthening rib 26 extends rearwardly from the sleeve 25 along the link 21.

As can be seen in FIGS. 1 and 3, arm 22 is somewhat C-shaped in plan view, and includes an upright post 28 adjacent to, but spaced inwardly from the right-hand end thereof. Post 28 is received within the vertical bore in sleeve 25 to pivotally mount the arm 22 relative to the link 21. A second upright vertical post 29 is provided adjacent the left-hand end of arm 22 and spaced inwardly therefrom, and the idler wheel 17 is rotatably mounted upon the post 29. A spring 30 is connected between a tab 31 on the bracket 11 and the apertured left-hand end portion 32 of the arm 22 to bias the arm 22 in a counterclockwise direction as viewed in the drawing. As will be readily understood, spring 30 functions to urge the driven portion 18 of the idler wheel towards the sleeve 16, and the driving portion 19 of the idler wheel toward the turntable flange 13.

The right-hand end of arm 22 is generally V-shaped in plan view, and includes diverging portions 34 and 35. Arm portion 34 is adapted to be engaged by an idler retractor lever described in the above mentioned Reed et al. application, for moving the driven wheel 18 out of engagement with the sleeve 16 when the record changer is shut off. Arm portion 35 is engageable with an abutment in the form of a vertically extending tab 36 on the bracket 11 for pivoting the arm 22 relative to the link 21 to move the idler wheel 17 to a clearance position wherein the outer periphery of the driven wheel 18 is spaced outwardly from the outer periphery of sleeve 16, so that the driven wheel 18 can be moved vertically downwardly from small diameter sleeve steps to larger diameter sleeve steps.

Cam means are provided for shifting the driven wheel 18 between the various steps on the motor shaft sleeve, and includes a generally semi-cylindrically shaped cam 40 having an outwardly extending flange 41 at the lower end thereof. Cam 40 includes inwardly extending webs 43 at the upper and lower end thereof, which are rotatably mounted on the pin 23. A manually movable link 42 engages cam flange 41 to pivot the cam 40 in opposite directions about pin 23. As can be best seen in FIG. 2, a slot is provided in the wall of cam 40 to define a pair of cam profiles 45 and 46 at the upper and lower surfaces of the slot. Each cam profile includes four generally horizontally disposed portions, each of which corresponds to one of the steps on the sleeve 16. Each cam profile also includes inclined portions connecting each of the horizontal portions and which serve to elevate and lower the driven wheel 18, as will hereinafter appear. A spring 47 engages the undersurface of link portion 24 and the upper surface of the lower cam web 43 to urge the link 21 upwardly. It will be understood, of course, that suitable retention means, such as C-washers or the like, are provided on pin 23 to prevent vertical movement of the cam 40. Thus, it should be understood that the cam 40 is free to rotate on the pin 23 but is held against verical movement relative thereto, while the link 21 is capable of pivoting on the pin 23, and of moving vertically relative thereto. Cam follower means in the form of a pin 49 extending rearwardly from the link portion 24 cooperate with the cam profiles 45 and 46 to move the link 21 downwardly against the bias of spring 47, and allow the link 21 to move upwardly under the action of spring 47, as will hereinafter be more fully described.

Detent means are provided for releasably retaining the cam 40 in a selected position, and includes a plurality of teeth 51 on the lower portion of cam 40 defining notches 52 therebetween. A detent member 53 is impaled by the pin 23, and is urged upwardly by a spring 54 which surrounds pin 23 and which is retained thereon by a suitable retaining member 55 fixed on the pin 23. Detent member 53 includes an upwardly extending bead 56 which is releasably received in the downwardly opening notches 52 to retain the cam 40 in the selected position. When the cam 40 is rotated to change the turntable speed, detent member 53 is moved downwardly by one of the teeth 51 against the bias of spring 54 to allow the bead 56 to move from one notch 52 to an adjacent notch.

Thus, assuming that the cam follower pin 49 is in the lowermost horizontal portion of the cam slot, and that driven wheel 18 is engaging the lowermost large diameter portion of the sleeve 16, if it is desired to change the turntable speed to a lower speed, it is necessary to move link 42 to the right to pivot cam 40 in a counterclockwise direction as viewed in the drawing. It will be understood, of course, that the terminal end of link 42 in connected to a pivotally mounted actuator that extends above the surface of the record changer motor board for manual operation, as is well known in the art. As the cam 40 is rotated in a counterclockwise direction, the cam follower pin 49 engages the lowermost inclined portion of cam profile 46 whereupon the inclined cam portion and the spring 47 cooperate to urge the link 21 upwardly until the cam follower pin 49 engages the next horizontal portion of cam profile 45. When the cam follower pin moves from the lowermost horizontal cam portion to the horizontal cam portion immediately thereabove, the driven wheel 18 snaps from the largest diameter portion of sleeve 16 to the smaller diameter portion immediately thereabove under the urging of springs 30, 47 and 54. The bead 56 on detent member 53 engages the appropriate notch 52 on the cam 40 to properly locate the cam, and thereby the link 21, in the selected position. It will be understood, of course, that as other turntable speeds are selected, the operation described above will be repeated.

Assuming now that the driven wheel 18 is in the position shown in the drawing engaging the uppermost small diameter portion of the sleeve 16, when it is desired to move the driven wheel 18 into one of the larger pulley steps, the following sequence takes place. The cam 40 is rotated in a clockwise direction by moving link 42 to the left, and this moves the uppermost inclined portion of cam profile 45 into engagement with the cam follower pin 49. The engagement of the cam follower pin with the uppermost inclined portion of cam profile 45 tends to move the link 21 downwardly against the bias of spring 47, but because of the resistance of the spring 47, the inclined cam portion pivots the link 21 in a clockwise direction as shown by the directional arrow in FIG. 3. Pivotal movement of link 21 also moves arm 22 until the leading edge on the arm portion 35 engages the upstanding tab 36 on the bracket 11. When arm portion 35 engages the abutment 36, arm 22 begins to pivot relative to the link 21 upon continued clockwise rotation of the link 21. As can be seen in FIG. 3 wherein the directional arrow shows that arm 22 has begun to move relative to link 21, the driven wheel 18 has been moved a substantial distance away from the outer periphery of the smallest diameter portion of the sleeve 16. It will be readily understood that upon still further continued clockwise movement of link 21, the arm 22 will be pivoted an additional increment in which the driven member 18 is moved to a clearance position spaced outwardly from the outer periphery of the largest diameter portion of the sleeve 16. Thus, it will be readily apparent that by use of the articulated linkage means mounting the idler wheel 17, the driven wheel 18 may be moved from a smaller step on the sleeve 16 to a larger step on the pulley 16 without binding upon the larger step. After the idler wheel is moved to the clearance position, it will be understood that continued clockwise rotation of the cam 40 will cause the inclined cam portion on cam profile 45 to move the link 21 downwardly to the desired position. The spring 54 and the inclination of the teeth 51 will urge the cam 40 into the selected position with a snap action.

Cam 40, link 21, and arm 22 are each preferably formed of a smooth, plastic material having a low coefficient of friction, such as the plastic available from the E. I. du Pont de Nemours and Company under the trademark "Delrin." With the use of such a material, the changing of record changer speeds can be effected with the use of a minimum amount of force.

I claim:
1. In a record changer having a turntable, means for rotating said turntable at a plurality of speeds and for changing the speed of said turntable comprising: a motor having a rotatable shaft; means on said shaft defining steps of different diameter, each step corresponding to a different speed of said turntable; drive transmission means engageable with said steps and with the turntable for rotating the latter; and means for moving said drive transmission means between said steps to change the speed of said turntable including, a support having an abutment, a link pivotally mounted on said support and having a cam follower at one end thereof, an arm pivotally mounted on said link and rotatably supporting said drive transmission means, said arm having a portion engageable with said abutment upon pivotal movement of said link in one direction to pivot said arm relative to said link and shift said drive transmission means to a clearance position where said drive transmission means can be moved from small diameter steps to large diameter steps, a cam pivotally mounted on said support and having cam portions corresponding with each of said turntable speeds, means for pivoting said cam in a first direction whereby said cam portions cooperate with the cam follower on said link to shift said drive transmission means from the larger steps to smaller steps, and means for pivoting said cam in a second direction whereby said link is pivoted in said one direction to pivot said arm relative to said link and move said arm portion into engagement with said abutment so that said drive transmission means is shifted into the aforementioned clearance position, and whereby said cam portions cooperate with the cam follower on said link to shift said drive transmission means from smaller steps to larger steps.

2. In a record changer having a turntable, means for rotating said turntable at a plurality of speeds and for changing the speed of said turntable comprising: a motor having a rotatable shaft; a sleeve on said shaft having portions of different diameter defining steps, each step corresponding to a different speed of said turntable; drive transmission means engageable with said sleeve and the turntable for rotating the latter; and means for moving said drive transmission means between said steps to change the speed of said turntable including, a support having an abutment, a link pivotally mounted on said support and having a cam follower at one end thereof, an arm pivotally mounted on said link adjacent to but spaced from one arm end to define an abutment portion at said one arm end engageable with said support abutment upon pivotal movement of said link in one direction to pivot said arm relative to said link, said arm rotatably supporting said drive transmission adjacent to the opposite end thereof so that engagement of said arm abutment portion with said support abutment shifts said drive transmission means to a clearance position where said drive transmission means can be moved from small diameter sleeve steps to large diameter sleeve steps, a cam pivotally mounted on said support and having cam portions corresponding with each of said turntable speeds, means for pivoting said cam in a first direction whereby said cam portions cooperate with the cam follower on said links to shift said drive transmission means from larger sleeve steps to smaller sleeve steps, and means for pivoting said cam in a second direction whereby said link is pivoted in said one direction to pivot said arm relative to said link and move said arm abutment portion into engagement with said support abutment so that said drive transmission means is shifted into the aforementioned clearance position, and whereby said cam portions cooperate with the cam follower on said link to shift said drive transmission means from smaller sleeve steps to larger sleeve steps.

3. A record changer as defined in claim 2 wherein said one arm end is generally V-shaped and defined by diverging legs, with one of said legs having said arm abutment portion thereon.

4. In a record changer having a turntable, means for rotating said turntable at a plurality of speeds and for changing the speed of said turntable comprising: a motor having a rotatable shaft; means on said shaft defining vertically spaced steps of different diameter, each step corresponding to a different speed of said turntable; drive transmission means engageable with said steps and with the turntable for rotating the latter; and means for moving said drive transmission means vertically between said steps to change the speed of said turntable including, a support having an abutment, a link pivotally mounted on said support and having a cam follower at one end thereof, an arm pivotally mounted on said link and rotatably supporting said drive transmission means, said arm having a portion engageable with said abutment upon pivotal movement of said link in one direction to pivot said arm relative to said link and shift said drive transmission means to a clearance position where said drive transmission means can be moved from small diameter steps to large diameter steps, a cam pivotally mounted on said support and having first cam portions corresponding with each of said turntable speeds, and second cam portions for vertically shifting said drive transmission means, means for pivoting said cam in a first direction whereby said second cam portions cooperate with the cam follower on said link to shift said drive transmission means vertically from larger steps to smaller steps, and said first cam portions locate said drive transmission means at a selected step, and means for pivoting said cam in a second direction whereby said link is pivoted in said one direction to pivot said arm relative to said link and move said arm portion into engagement with said abutment so that said drive transmission means is shifted into the aforementioned clearance position, and whereby said cam second portion cooperate with the cam follower on said link to shift said drive transmission means vertically from smaller steps to larger steps and said first cam portions locate said drive transmission means at a selected step.

5. A record changer as defined in claim 4 in which said cam includes a generally semi-cylindrical wall having a slot therein, and wherein said first cam portions are defined by horizontal portions of said slot and said second cam portions are defined by inclined portions of said slot.

6. A record changer as defined in claim 5 wherein said cam, link, and arm are formed of a plastic material having a low coefficient of friction.

7. A record changer as defined in claim 4 wherein said cam includes detent means for releasably retaining said drive transmission means at a selected sleeve step.

8. A record changer as defined in claim 4 wherein spring means are provided for urging said drive transmission means toward said sleeve.

9. Drive means for driving a driven member at different speeds comprising: a motor having a rotatable shaft; means on said shaft defining steps of different diameter, each step corresponding to a different speed of said driven member; drive transmission means engageable with said steps and with the driven member for rotating the latter; and means for moving said drive transmission means between said steps to change the speed of said driven member including, a support having an abutment, a link pivotally mounted on said support and having a cam follower at one end thereof, an arm pivotally mounted on said link and rotatably supporting said drive transmission means, said arm having a portion engageable with said abutment upon pivotal movement of said link in one direction to pivot said arm relative to said link and shift said drive transmission means to a clearance position where said drive transmission means can be moved from small diameter steps to large diameter steps, a cam pivotally mounted on said support and having cam portions corresponding with each of the speeds of said driven member, means for pivoting said cam in a first direction whereby said cam portions cooperate with the cam follower on said link to shift said drive transmission means from the larger steps to smaller steps, and means for pivoting said cam in a second direction whereby said link is pivoted in said one direction to pivot said arm relative to said link and move said arm portion into engagement with said abutment so that said drive transmission means is shifted into the aforementioned clearance position, and whereby said cam portions cooperate with the cam follower on said link to shift said drive transmission means from smaller steps to larger steps.

10. Drive means for driving a driven member at different speeds comprising: a support having a stationary abutment thereon; a motor carried by said support and having a rotatable shaft; means on said shaft defining steps of different diameter in fixed relationship with said abutment; driven wheel means engageable with said steps and said driven member for rotation of the latter; articulated linkage means supporting said driven wheel, said articulated linkage means including a link pivotally mounted on said support at a location a fixed distance from said motor shaft and said abutment, said link having cam follower means at one end thereof, and an arm pivotally mounted on said link and carrying said driven wheel means, said arm having a portion thereof engageable with said abutment to pivot said arm relative to said link and shift said driven wheel to a clearance position spaced outwardly from the outer periphery of the largest diameter step; and cam means engageable with said cam follower means for moving said link into engagement with said abutment and for shifting said driven wheel from the smallest diameter step to the largest diameter step.

References Cited

FOREIGN PATENTS

| 218,630 | 11/1958 | Australia. |
| 638,459 | 3/1962 | Canada. |
| 1,171,769 | 10/1958 | France. |
| 871,921 | 7/1961 | Great Britain. |

LEONARD FORMAN, *Primary Examiner.*

HARRY N. HAROIAN, *Examiner.*